(12) United States Patent
Felt et al.

(10) Patent No.: US 9,325,823 B2
(45) Date of Patent: Apr. 26, 2016

(54) VISUAL ADDRESS BOOK AND DIALER

(75) Inventors: Michelle Felt, Randolph, NJ (US); Nader Gharachorloo, Ossining, NY (US); Donald H. Relyea, Dallas, TX (US); Ruchir Rodrigues, Irving, TX (US); Afshin Moshrefi, Newburyport, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1647 days.

(21) Appl. No.: 12/339,643

(22) Filed: Dec. 19, 2008

(65) Prior Publication Data

US 2010/0162171 A1    Jun. 24, 2010

(51) Int. Cl.
*G06F 3/048* (2013.01)
*H04M 1/2745* (2006.01)
*G06F 3/0481* (2013.01)

(52) U.S. Cl.
CPC ......... *H04M 1/27455* (2013.01); *G06F 3/0481* (2013.01); *H04M 2250/22* (2013.01)

(58) Field of Classification Search
CPC ......... G06F 3/048; G06F 3/481; G06F 3/017; G06F 3/0481; G06F 3/0488; G06F 3/04883; G06F 3/0483; G06F 3/04842; G06F 3/1423
USPC .................................. 715/713, 758, 810, 864
See application file for complete search history.

(56) References Cited

U.S. PATENT DOCUMENTS

| | | | |
|---|---|---|---|
| 7,231,607 B2* | 6/2007 | Neely et al. .................... 715/747 |
| 2004/0102225 A1* | 5/2004 | Furuta et al. ................... 455/566 |
| 2004/0235520 A1* | 11/2004 | Cadiz et al. .................... 455/557 |
| 2005/0246658 A1* | 11/2005 | Uemura et al. ................ 715/805 |
| 2006/0047425 A1* | 3/2006 | Fukumi et al. ................. 701/209 |
| 2006/0104430 A1* | 5/2006 | Kirkland et al. .......... 379/211.04 |
| 2007/0035513 A1* | 2/2007 | Sherrard et al. ............... 345/157 |
| 2008/0309617 A1* | 12/2008 | Kong et al. ..................... 345/157 |
| 2010/0073454 A1* | 3/2010 | Lovhaugen et al. ........ 348/14.03 |

* cited by examiner

*Primary Examiner* — Claudia Dragoescu

(57) ABSTRACT

A method may include associating a plurality of graphical images with a plurality of contacts in a device having contact management functionality and displaying the plurality of graphical images to a user. The method may further include receiving a user selection of one of the plurality of graphical images; and initiating voice-based communication with the contact associated with the selected graphical image.

24 Claims, 13 Drawing Sheets

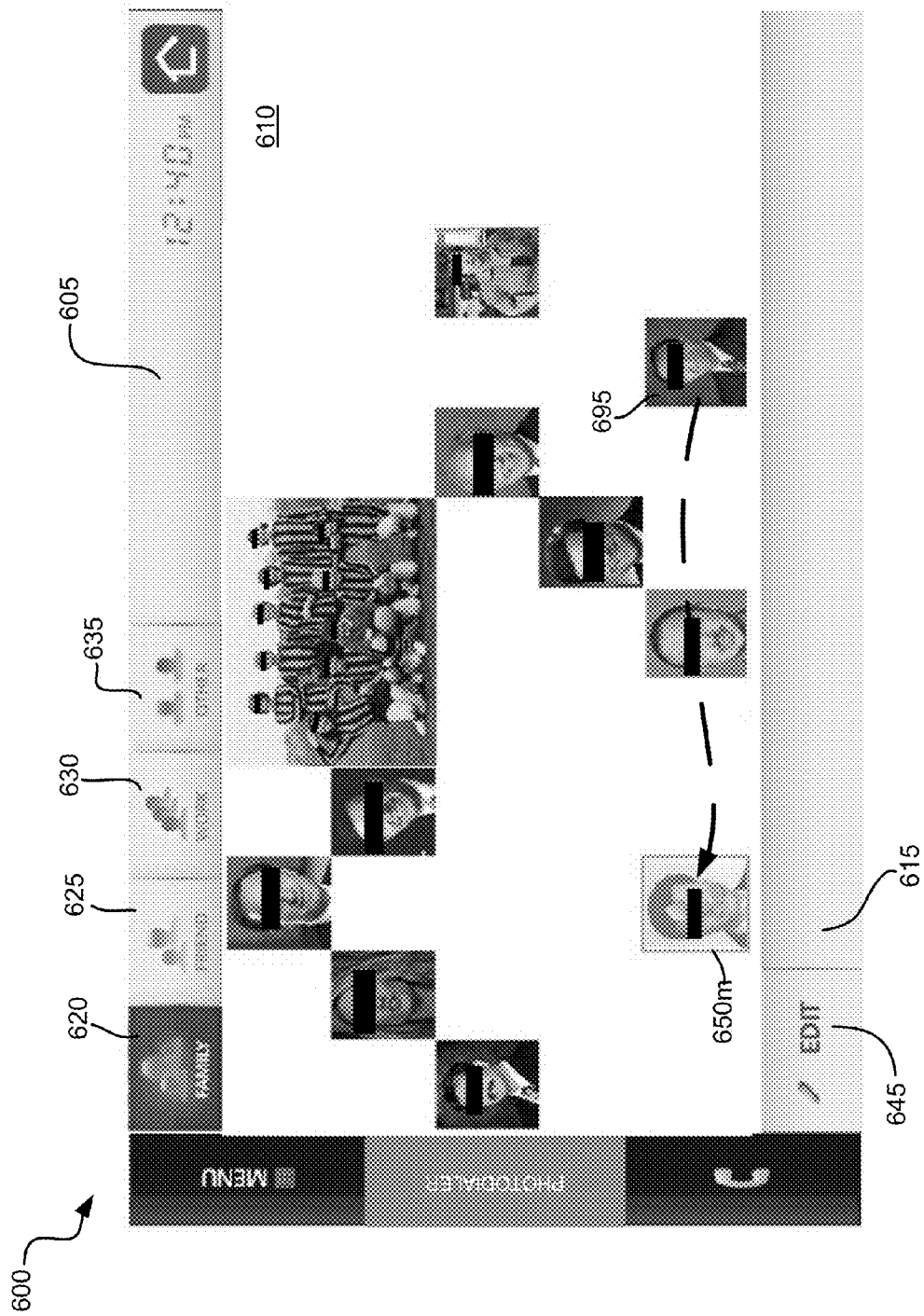

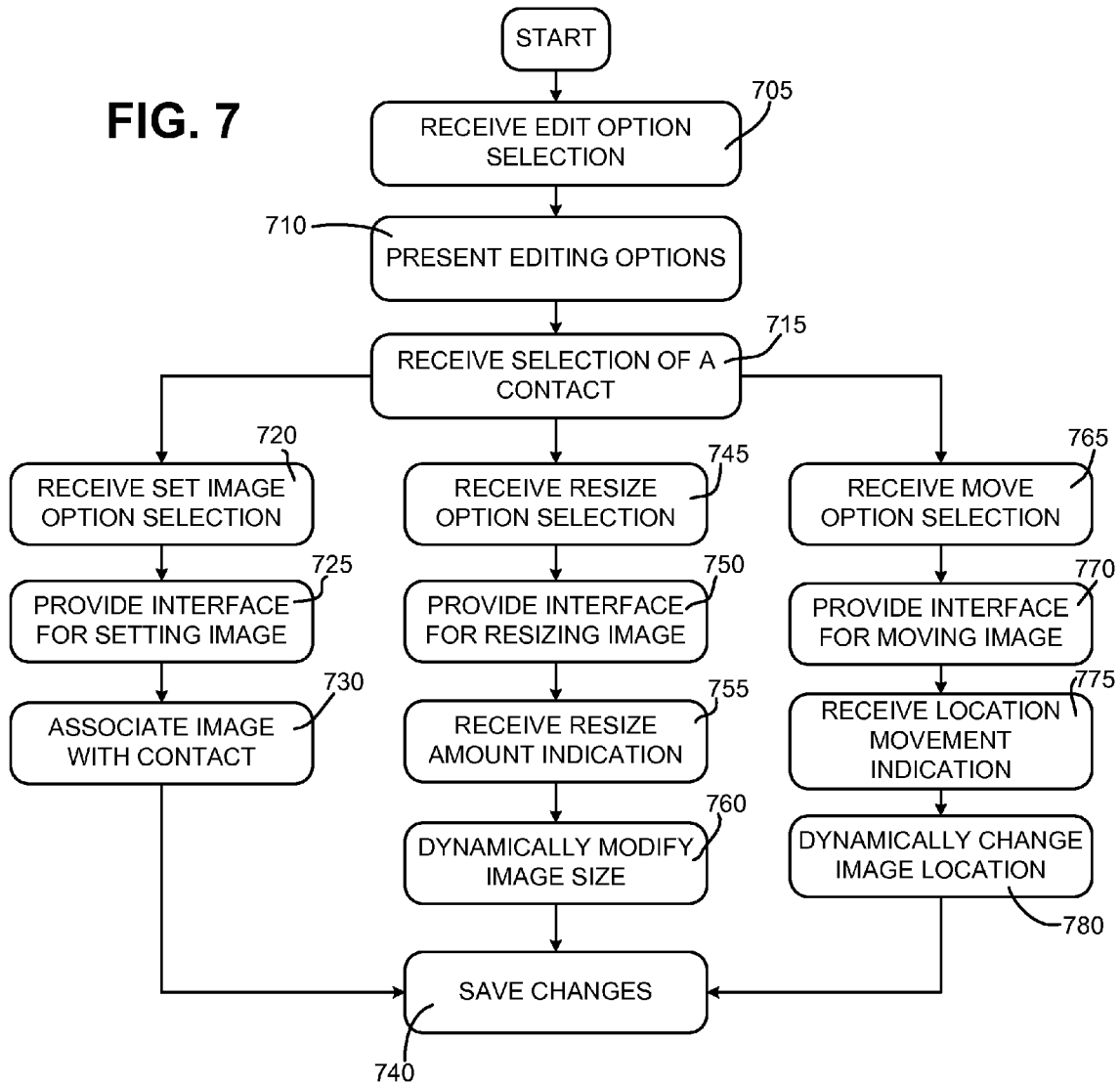

VISUAL ADDRESS BOOK AND DIALER

BACKGROUND INFORMATION

Modern communications devices often include contact management or address book functionality for enabling users to store contact information for a variety of entities, such as friends, family, businesses, etc. For example, an analog telephone device may include a speed dial listing; a mobile telephone may include an address book that lists available contacts, etc.

BRIEF DESCRIPTION OF THE DRAWINGS

FIGS. 5 and 6A-6E are block diagrams of exemplary graphical user interfaces for providing contact image display and interaction/manipulation;

FIG. 7 is a flowchart of an exemplary process for providing contact image editing functionality.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

One or more embodiments disclosed herein may enable a user to quickly and easily identify and communicate with one or more contacts, through a display of a user device, such as a home telephone. In one implementation, available contacts on the user device may be associated with a graphical image or icon (such as a photograph) representing the contact. The user device may present the contact images in a manner that enables a user to easily differentiate and locate a desired contact. The user device may further facilitate importation and/or retrieval of contact images for association with contacts.

Figure 1:
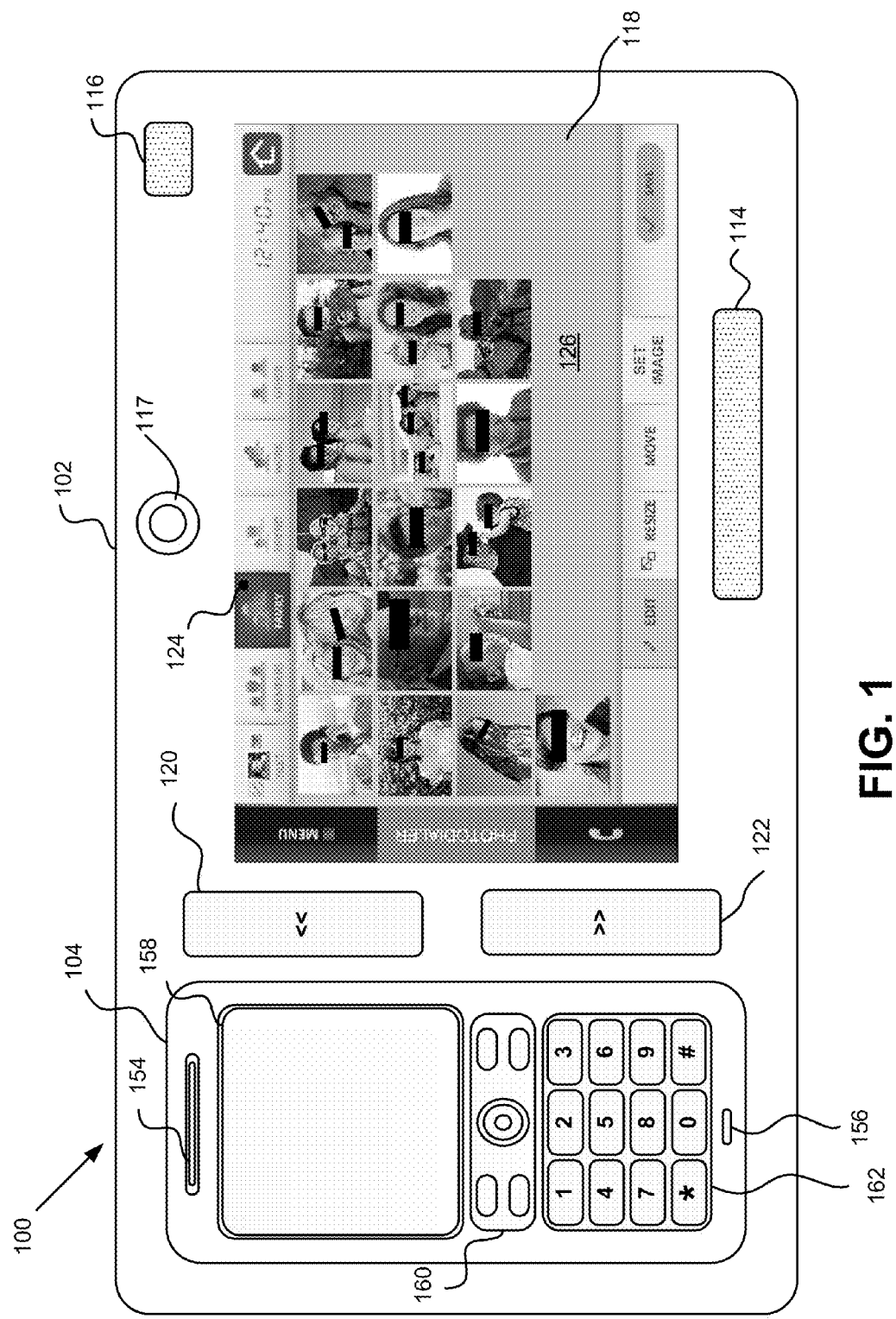
FIG. 1 is a block diagram of an exemplary user device in which embodiments disclosed herein may be implemented.

FIG. 1 is diagram of an exemplary user device 100. As illustrated, user device 100 may include a base 102 and a handset 104. User device 100 may include the functionality of a telephone and the ability to display contact information for various contacts, among other things. For example, base 102 may include a screen 118 that displays contact images associated with various contacts known to the user. Functioning as a telephone, a user may answer a call by picking up handset 104 from base 102. In this example, handset 104 may communicate with base 102, which may communicate with a telephone network, for example.

Base 102 may include a speaker 114, a microphone 116, a lens assembly 117, display 118, and control buttons 120 and 122. Handset 104 may include a speaker 154, a microphone 156, a display 158, control keys 160, and a keypad 162. User device 100 may include other components (not shown) that aid in receiving, transmitting, and/or processing data. Moreover, other configurations of user device 100 are possible.

Regarding base 102, speaker 114 may provide audible information to a user and microphone 116 may receive audible information from the user, such as during speakerphone or video call operation. Display 118 may include a display screen to provide visual information to the user, such as video images or pictures. For example, display 118 may provide information regarding incoming or outgoing telephone calls, telephone numbers, contact information, current time, voicemail, email, etc. Lens assembly 117 may include an image capturing assembly for manipulating light rays from a given or a selected range, so that images in the range can be captured in a desired manner. Display 118 may also provide graphical images relating to contacts known to the user, as shown in FIG. 1. Display 118 may include a touch-screen display to accept inputs from the user. For example, display 118 may include a FAMILY icon 124 which, when touched, may cause user device 100 to display family-related contact images in a contact display region 126.

Control buttons 120 and 122 may permit the user to interact with user device 100 to cause user device 100 to perform one or more operations, such as advancing information displayed on display 118 backward (e.g., by pressing button 120) or forward (e.g., by pressing button 122). In one embodiment, control buttons 120 and 122 may include soft keys that may perform the functions indicated on display 118 directly next to the buttons.

Regarding handset 104, speaker 154 may provide audible information to a user of handset 104. Microphone 156 may receive audible information from the user of handset 104. Display 158 may include a display screen to provide visual information to the user, such as video images or pictures, and may include a touch-screen display to accept inputs from the user. For example, display 158 may provide information regarding incoming or outgoing telephone calls, telephone numbers, contact information, current time, voicemail, email, etc. In one exemplary implementation, base 102 may support video or image-based calling using, e.g., lens assembly 117. For example, upon initiation of a call to another user, lens assembly 117 may become active and may capture image data. The captured image data may be transmitted, e.g., via a data network, to a receiving device.

Control keys 160 may permit the user of handset 104 to interact with handset 104 and/or user device 100 to cause handset 104 and/or user device 100 to perform one or more operations. In one embodiment, control keys 160 may include soft keys that may perform the functions indicated on display 158. Keypad 162 may include a standard telephone keypad (including alphabetic characters, not shown) and may include additional keys to enable inputting (e.g., typing) information into user device 100.

Figure 2:
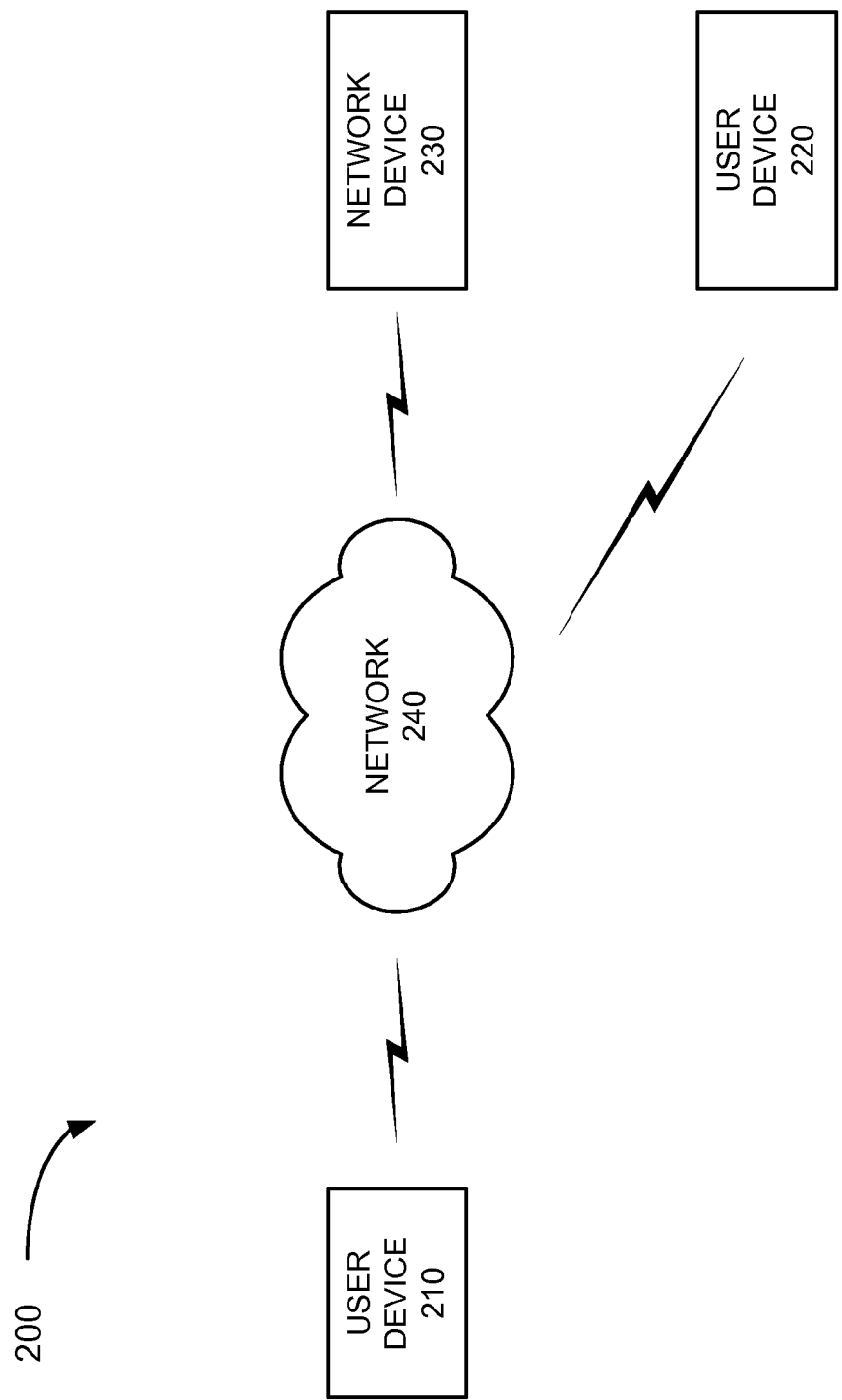
FIG. 2 is a block diagram of an exemplary network in which embodiments described herein may be implemented.

FIG. 2 is a block diagram of an exemplary network 200 in which systems and methods described herein may be implemented. Network 200 may include user device 210, user device 220, network device 230, and network 240. User devices 210 and 220 may connect to network 240 and/or each other via wired, wireless or optical communication mechanisms. In other embodiments, network 200 may include more, fewer, or different devices. Moreover, one or more devices 210-230 may perform one or more functions of any other device in network 200. Furthermore, one or more of devices 210-230 may be remotely located from each other, e.g., devices 210-230 may be geographically diverse.

Each of user devices 210 and 220 may include one or more user devices 100 as shown in FIG. 1 and described above. As such, user devices 210/220 may include one or more computer systems for hosting programs, databases, and/or applications. For example, user devices 210/220 may host one or more programs that enable a user to place or receive telephone calls. User devices 210/220 may also host one or more programs that enable a user to configure, browse, and use an address book or other contact management application. In other implementations, user devices 210/220 may host one or more programs for providing Internet/Intranet access, messaging, such as text messaging, multi-media messaging, instant messaging, e-mail, etc., an organizer, a calendar, and/or a global positioning system (GPS) receiver. In one embodiment, user devices 210/220 may be a stationary (e.g., home) telephone. In another embodiment, user devices 210/220 may be a mobile (e.g., cellular) telephone. In alternative embodiments, one or more of user devices 210/220 may include a personal computer (PC), laptop computer, palmtop receiver, personal digital assistant (PDA), remote control device and/or any other appliance that may include a radiotelephone transceiver and other applications for providing data processing and data communication functionality.

Network device 230 may include one or more computer systems for hosting programs, databases, and/or applications. For example, network device 230 may include one or more web servers or other network-accessibly server devices configured to store information for retrieval via network 240. Exemplary information may include web documents, images, contact information, addressing information, etc. User devices 210/220 may communicate with network device 230, either periodically, or upon an explicit request to retrieve information from network device 240. User devices 210/220 may incorporate retrieved information into provided functionality in the manner described in additional detail below.

Network 240 may include one or more wired, wireless and/or optical networks that are capable of receiving and transmitting data, voice and/or video signals, including multimedia signals that include voice, data and video information. For example, network 240 may include one or more public switched telephone networks (PSTNs) or another type of switched network. Network 240 may also include one or more wireless networks and may include a number of transmission towers for receiving wireless signals and forwarding the wireless signals toward the intended destination. Network 240 may further include one or more packet switched networks, such as an Internet protocol (IP) based network, a local area network (LAN), a wide area network (WAN), a personal area network (PAN), an intranet, the Internet, or another type of network that is capable of transmitting data.

The exemplary configuration illustrated in FIG. 2 is provided for simplicity. It should be understood that a typical network may include more or fewer devices than those illustrated in FIG. 2. For example, other devices that facilitate communications between the various entities illustrated in FIG. 2 may also be included in network 200. In addition, user devices 210-230 are each shown as separate elements. In other instances, the functions described as being performed by two or more user devices may be performed by a single user device.

Figure 3:
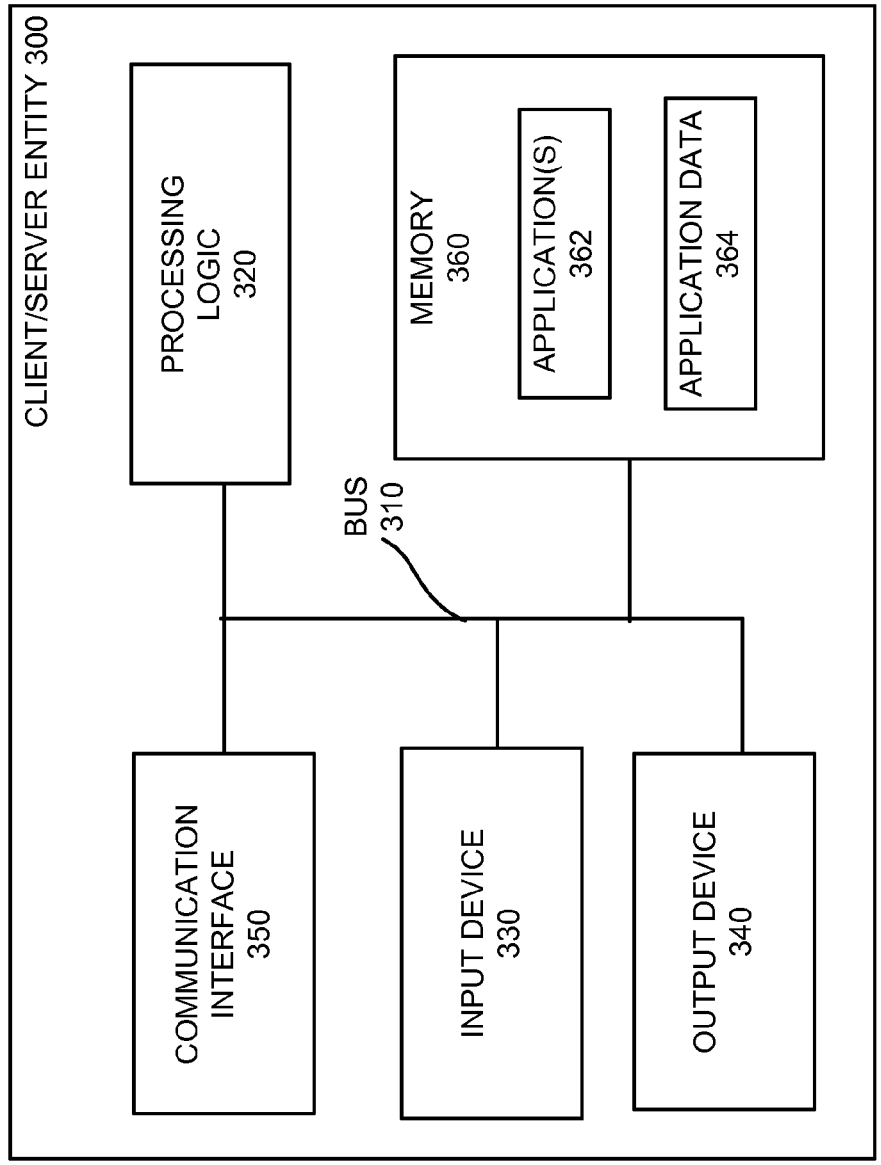
FIG. 3 is a block diagram of exemplary components of a client/server entity.

FIG. 3 is an exemplary diagram of a client device or server entity 300 (hereinafter called "client/server entity 300"), which may correspond to one or more of user devices 210/220 or network device 230. User devices 210/220 and network device 230 may each include one or more client/server entities. For example, base 102 may include an instance of client/server entity 300 and handset 104 may include another instance of client/server entity 300. Client/server entity 300 may include a bus 310, processing logic 320, an input device 330, an output device 340, a communication interface 350, and a memory 360. Client/server entity 300 may include other components (not shown) that aid in receiving, transmitting, and/or processing data, such as image data, video data, or audio data. Moreover, other configurations of components in client/server entity 300 are possible.

Bus 310 may include a path that permits communication among the components of client/server entity 300. Processing logic 320 may include any type of processor or microprocessor (or groups of processors or microprocessors) that interprets and executes instructions. In other embodiments, processing logic 320 may include an application-specific integrated circuit (ASIC), a field-programmable gate array (FPGA), or the like.

Input device 330 may include a device that permits a user to input information into client/server entity 300, such as a keyboard (e.g., control keys 160, keypad 162, or control buttons 120 and 122), a mouse, a pen, a microphone (e.g., microphone 156 or 116), a remote control, a touch-screen display (e.g., display 118 or 158), a camera or video camera (e.g., lens assembly 117), etc. Output device 340 may include a device that outputs information to the user, such as a display (e.g., display 118 or 158), a printer, a speaker (e.g., speaker 114 or 154), etc.

Input device 330 and output device 340 may allow the user to activate a particular service or application, such as an application to browse venue and event information. Input device 330 and output device 340 may allow the user to receive and view a menu of options and select options from the menu. The menu may allow the user to select various functions or services associated with applications executed by client/server entity 300. For example, the menu may allow the user to select an event and purchase tickets to that event.

Communication interface 350 may include any transceiver-like mechanism that enables client/server entity 300 to communicate with other devices and/or systems. Communication interface 350 may include a wired and/or wireless transmitter and a wireless and/or wired receiver. Communications interface 350 may include a network interface card, e.g., Ethernet card, for wired communications, or a wireless network interface (e.g., a WiFi, WiMAX, or HSDPA) card for wireless communications. Communication interface 350 may also include, for example, a universal serial bus (USB) port for communications over a cable, a Bluetooth wireless interface for communicating with Bluetooth devices, etc.

Memory 360 may include a random access memory (RAM) or another type of dynamic storage device that may store information and instructions, e.g., an application, for execution by processing logic 320; a read-only memory (ROM) device or another type of static storage device that may store static information and instructions for use by processing logic 320; and/or some other type of magnetic or optical recording medium and its corresponding drive, e.g., a hard disk drive (HDD), for storing information and/or instructions.

Memory 360 may include one or more applications 362 and application data 364. In the case of base 102, for example, applications 362 may include an address book or contact dialer application for enabling users to identify and contact individuals and/or entities, such as businesses, services, etc. Application data 364 may include user profile information associated with individual users of devices 210/220. For example, base 102 may be used in a family environment in which the parents and children each maintain separate user profiles. Upon identification of a user (e.g., via user selection of a identifier at, for example, a home screen), base 102 may provide information corresponding to the identified user. In addition to user-displayed information, application data 364 may include additional user information, such as preferences, settings, etc.

In the case of a network device 230, applications 362 may include a web server or other type of server application (e.g., an FTP (file transfer protocol) server) configured to store information and to send the information to user devices 210/220, either periodically, or upon request from user devices 210/220. In this case, application data 364 may include image or contact information maintained in a web-accessible repository, such as an online address book or social networking environment (e.g., Facebook, Myspace). Alternatively, application data 364 may include images data corresponding to a specific URL (uniform resource locator). In other implementations, applications 362 may include a gateway server application for receiving information and transmitting information to user devices 210/220. For example, a gateway server application may include an application for receiving text messages (e.g., SMS (short message system) messages) or multimedia messages (e.g., MMS messages) from a messaging system and forwarding the received messages to user devices 210/220.

Client/server entity 300 may perform certain operations, as described herein. Client/server entity 300 may perform these operations in response to processing logic 320 executing software instructions contained in a computer-readable medium, such as memory 360. A computer-readable medium may be defined as a physical or logical memory device. The software instructions may be read into memory 360 from another computer-readable medium or from another device via communication interface 350. The software instructions contained in memory 360 may cause processing logic 320 to perform processes that are described herein.

Figure 4:
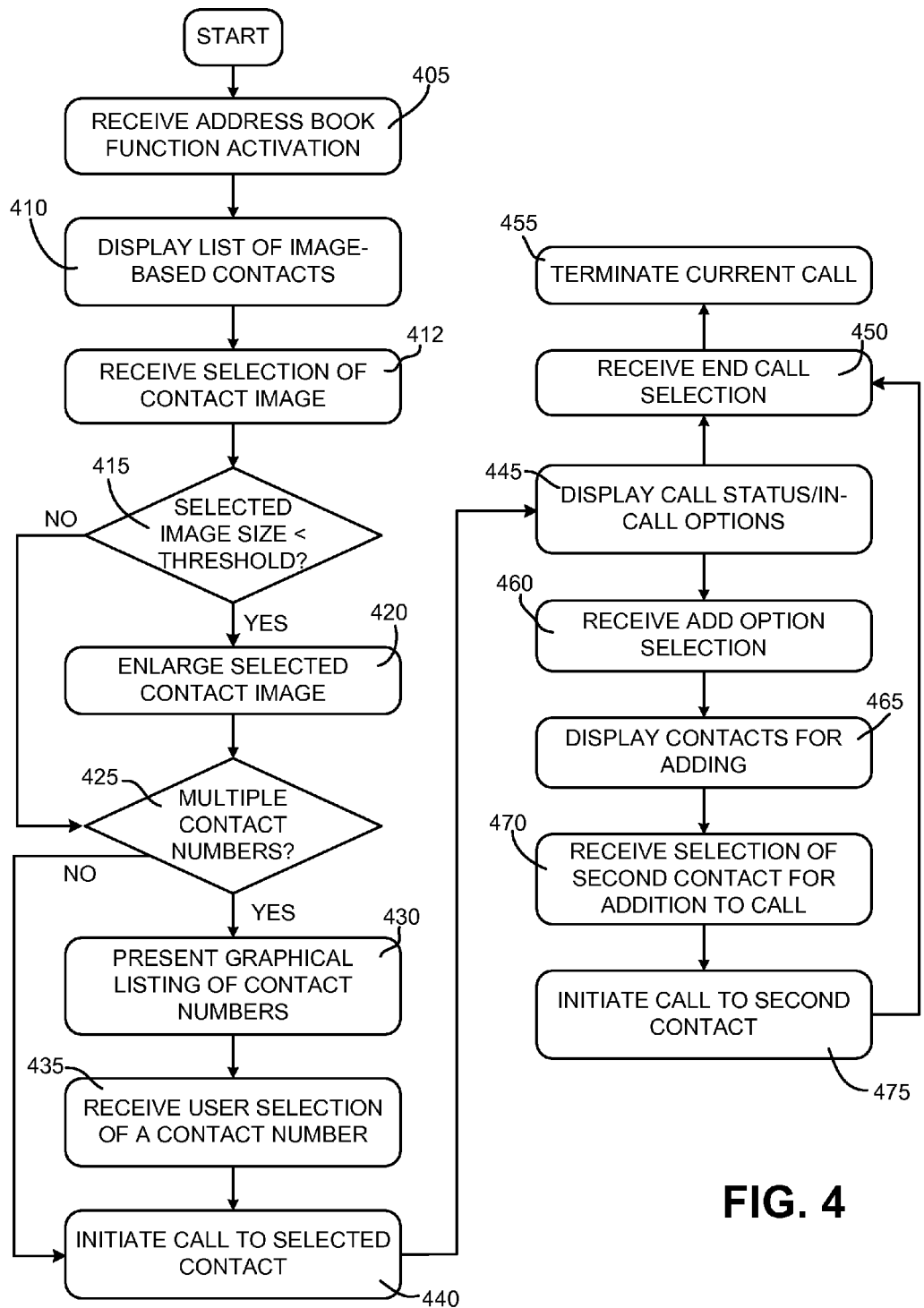
FIG. 4 is a flowchart of an exemplary process for providing contact management and dialing functionality.

FIG. 4 is a flowchart of an exemplary process 400 for providing a visual address book/dialing application on user device 210/220 of FIG. 2. FIG. 4 is described with respect to FIGS. 5 and 6A-6D, which are diagrams of graphical user interfaces (e.g., screens) that may be shown on display 118 of user device 100, for example. For simplicity, process 400 is described below with respect to user device 210.

Figure 5:
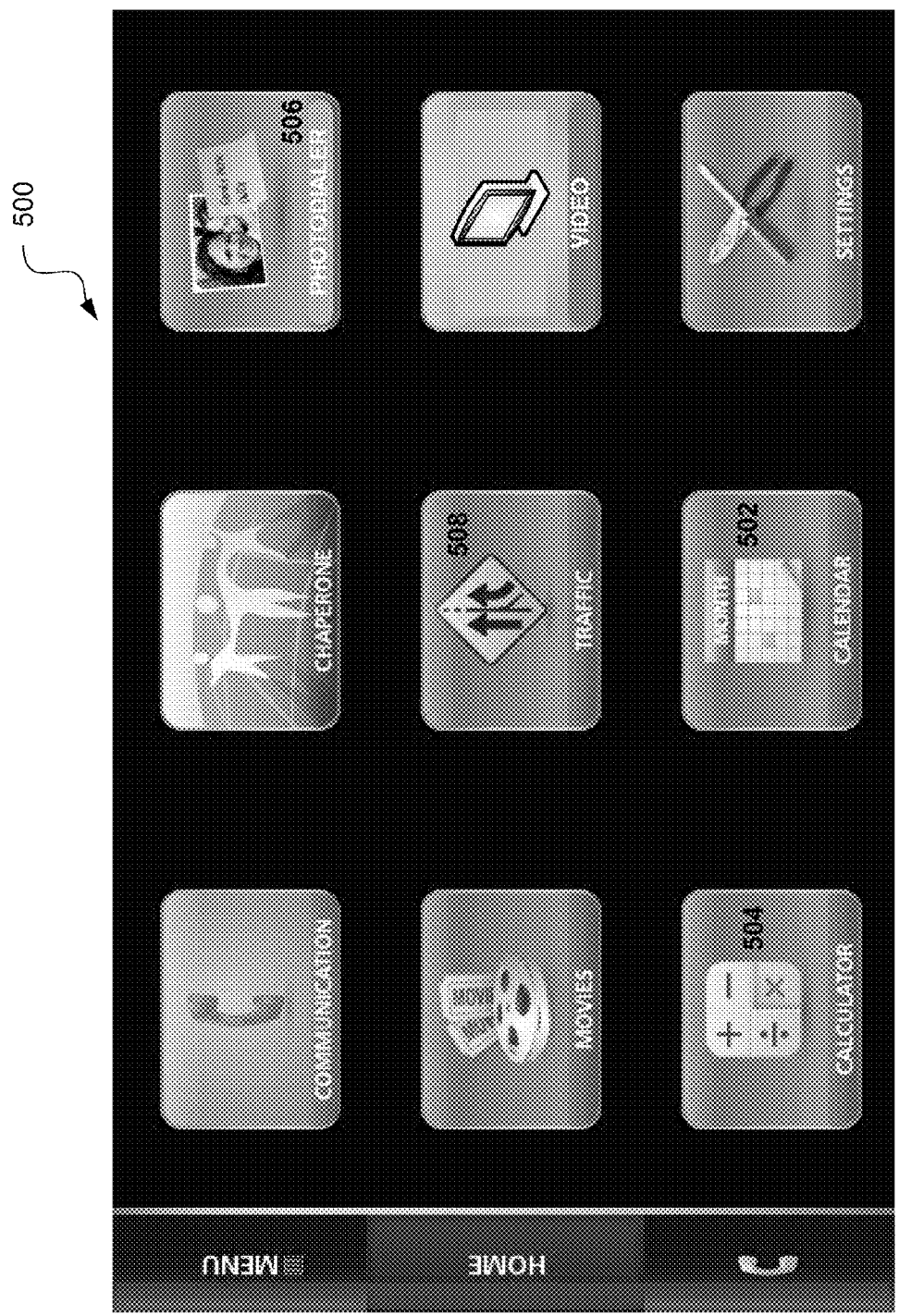

Process 400 may begin when a user activates a communications or address book application on user device 210/220 (block 405). For example, user device 210 may display a screen 500 as shown in FIG. 5 on display 118. A user may select among various functions offered by user device 100. For example, a user could touch a CALENDAR icon 502 to display and interact with a calendar function or application, a CALCULATOR icon 504 to display and interact with a calculator function, a PHOTODIALER icon 506 to display and interact with a messaging/address book function or application, or a TRAFFIC icon 508 to display and interact with a current traffic conditions application or function. As shown, other icons for additional functionality may be displayed on screen 500. In this example, icon 506 is labeled PHOTODIALER; however, it should be noted that any suitable descriptive label may be used, such as ADDRESS BOOK, VISUAL ADDRESS BOOK, CONTACTS, etc. Activation of the address book function (block 405) may correspond to a user selecting icon 506 on screen 500, for example.

Device 210, in response to the selection of the address book function icon (e.g., icon 506), may display a list of contacts using graphical images or icons (block 410). For example, user device 210 may display a screen 600 as shown in FIG. 6A on display 118.

As illustrated, screen 600 may include several display elements, including a navigation region 605, an image-based contact region 610, and a modification region 615. Navigation region 605 may include selectable icons relating to various user-defined groups of contacts, such as FAMILY icon 620, FRIEND icon 625, WORK icon 630, and OTHER icon 635. Selection of each icon may result in a corresponding group of contacts being graphically displayed in image-based contact region 610. As illustrated in FIG. 6A, image-based contact region 610 corresponding to a selection of FAMILY icon 620 may include various images 640 corresponding to contacts categorized as family by a user of user device 210.

Depending on settings associated with user device 210, user device 210 may be configured to display contacts corresponding to one of icons 620-635. For example, user device 210 may be configured to display contacts corresponding to the most-recently displayed group of contacts upon activation of the address book application (block 405). In another implementation, user device 210 may be configured to display contacts corresponding to the most-frequently displayed group of contacts upon activation of the address book application. In still another implementation, user device 210 may be configured to display contacts corresponding to a pre-assigned group of contacts upon activation of the address book function (e.g., FAMILY contacts). It should be noted that, with respect to FIGS. 6A-6E, 8, and 9, individuals depicted in the contact images displayed in image-based contact region 610 have been anonymized by placing a black bar across recognizable features. Actual contact images used during the implementation of user device 210 would, of course, be provided without such protective features.

Figure 6A:
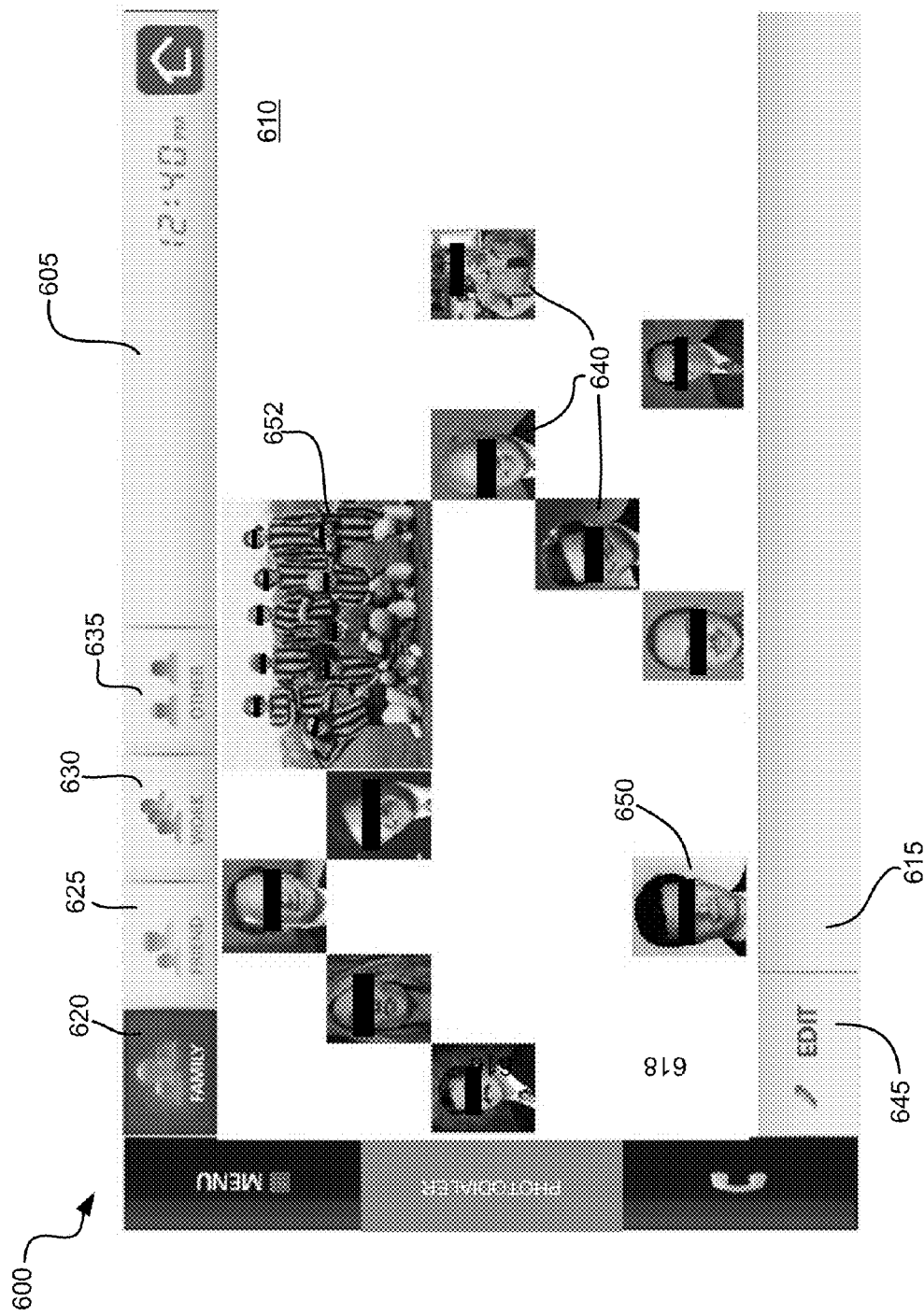

As depicted in FIG. 6A, images displayed in image-based contact region 610 may be presented in multiple different sizes or layouts, such as, for example, a grid-based pattern or a free-form layout independent of any default spatial relationships between contact images. For example, images associated with more important or more frequently contacted contacts may be provided in a larger size than images associated with lesser-used contacts. As described below, the sizing and relative positioning of contact images may be set and/or modified by users in according with EDIT option 645, which may be included in modification region 615 of screen 600. Features corresponding to EDIT option 645 will be discussed in detail below, with respect to FIGS. 7 and 8.

The interactive image-based address book function provides a user of user device 210 with an efficient and easy to use interface for finding and contacting one or more contacts. Returning to FIG. 4, user device 210 may receive a user selection of an identified contact image provided in image-based contact region 610 (block 412). For example, if user device 210 includes a touch screen display (e.g., display 118), the user selection of the contact image may be received via direct interaction with the icon or image associated with the selected contact. Alternatively, control keys associated with user device 210 may be used to select a particular one of the image-based contacts from among those displayed to the user.

Upon receipt of the user selection of the identified contact, user device 210 may determine whether a size of the contact image is less than a predetermined threshold size (e.g., 72 pixels×72 pixels) (block 415). As briefly described above, images or icons associated with contacts may be sized differently by the user to reflect a relative importance or priority among the various contacts displayed. If the selected contact is associated with an image or icon that is greater than or equal to the predetermined threshold (block 415-NO), processing may continue to block 425 described below.

However, if the selected contact is associated with an image or icon that is less than the predetermined threshold (block 415-YES), user device 210 (e.g., processor 320 may be configured to enlarge the image or icon to a predetermined size (block 420). For example, assume that display 118 of user device 210 has a screen resolution of 800 pixels wide by 480 pixels high (e.g., a WVGA resolution). Further assume that the selected contact image (e.g., contact image 650) has a resolution of 40 pixels×58 pixels, which falls below the threshold of 72 pixels×72 pixels. In this instance, selection of a contact image (e.g., contact image 650) may result in automatic enlargement of contact image 650 to a size equal to or greater than the threshold and display of the enlarged contact image. In one example, user device 210 may digitally zoom the contact image using any number of known techniques based on a level of processing or quality of resultant image desired. In one implementation, the selected contact image may transition from a smaller size to the enlarged size via a graphical animation, such as a morphing or ballooning effect.

Figure 6B:
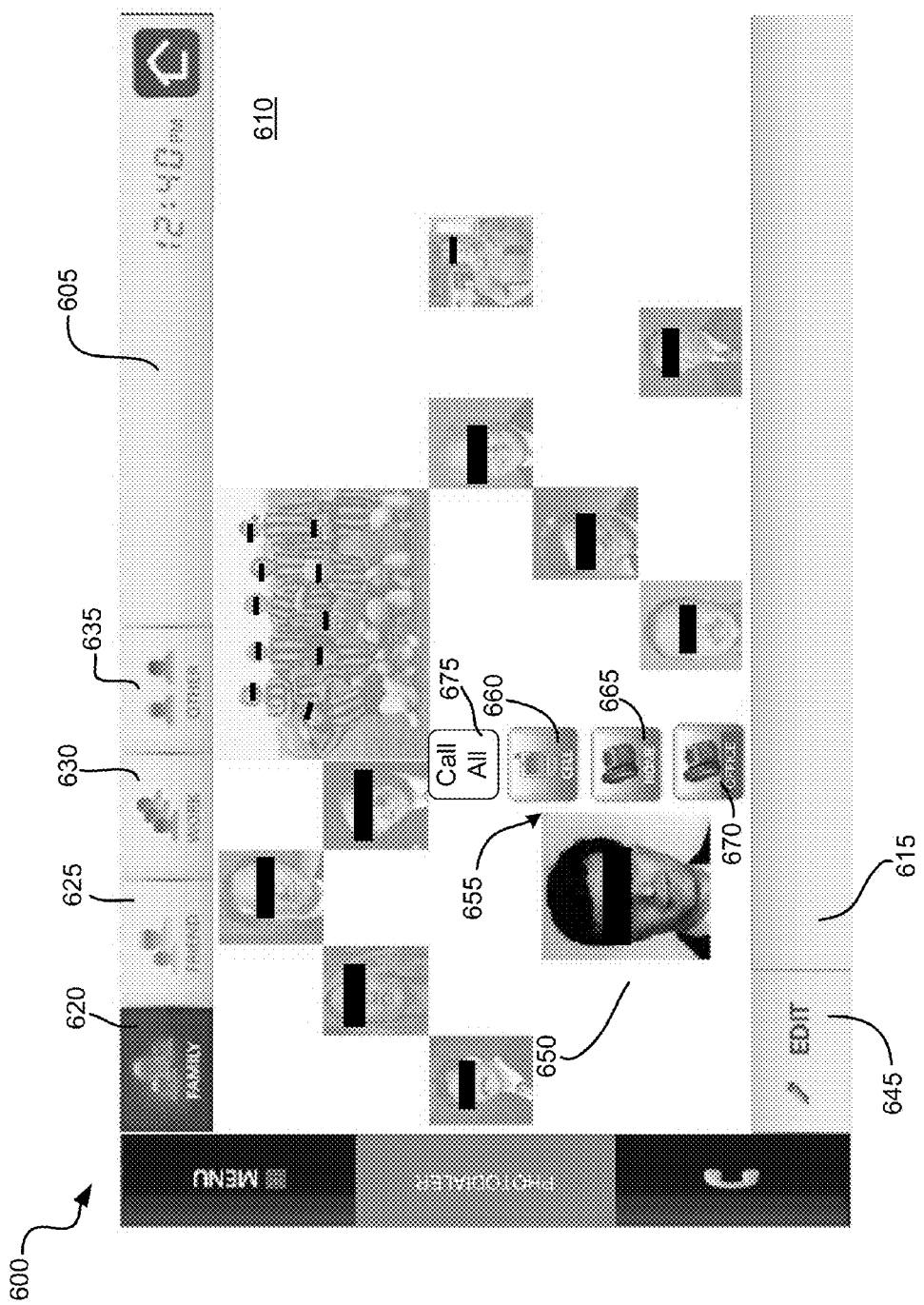

FIG. 6B illustrates graphical user interface screen 600 upon receiving a user selection of a particular contact image (e.g., block 410). As illustrated in FIG. 6B, contact image 650 has been enlarged from a size depicted in FIG. 6A to a size depicted in FIG. 6B. By automatically enlarging smaller contact images upon selection, user device 210 provides users with a more accurate manner of positively identifying contacts prior to initiating communication with them.

User device 210 may determine whether the selected contact has more than one contact number (e.g., phone number) associated therewith (block 425). For example, a contact may have a home phone number, a work phone number, and a mobile or cellular phone number. If it is determined that the selected contact has more than one contact number associated therewith (block 425-YES), user device 210 may present a graphical listing of the available contact numbers for selection by a user (block 430). FIG. 6B illustrates such a graphical listing 655 including a graphical cell phone representation 660, a graphical home phone representation 665, and a graphical office phone representation 670. Although phone number graphical representations 660-670 illustrated in FIG. 6B do not specify contact numbers associated with the respective representations, it should be understood that alternative implementations may provide additional levels of information for display to the user, such as the telephone numbers being displayed in a cloud or balloon adjacent to the contact image.

In addition to graphical representations relating to individual contact numbers, screen 600 may also display a Call All graphical option 675. Consistent with embodiments described herein, selection of Call All option 675 may instruct user device 210 to sequentially call each number associated with a contact until one of the calls is answered, or none of the calls is answered. In one implementation, the various contact numbers may be called in a predetermined order, such as office number, then home number, then cell number.

User device 210 may receive a user selection of one of the contact number representations 660-670 or Call All option 675 (block 435). Alternatively, user device 210 may determine that the selected contact includes only a single contact number (block 425-NO). User device 210 may initiate a call to the selected number (block 440). For example, user device 210 may initiate a call to user device 220 via network 240, such as a VoIP call, a PSTN call, a cellular-based (e.g., CDMA, GSM, etc) call, or a video call (e.g., using lens assembly 117).

Figure 6C:
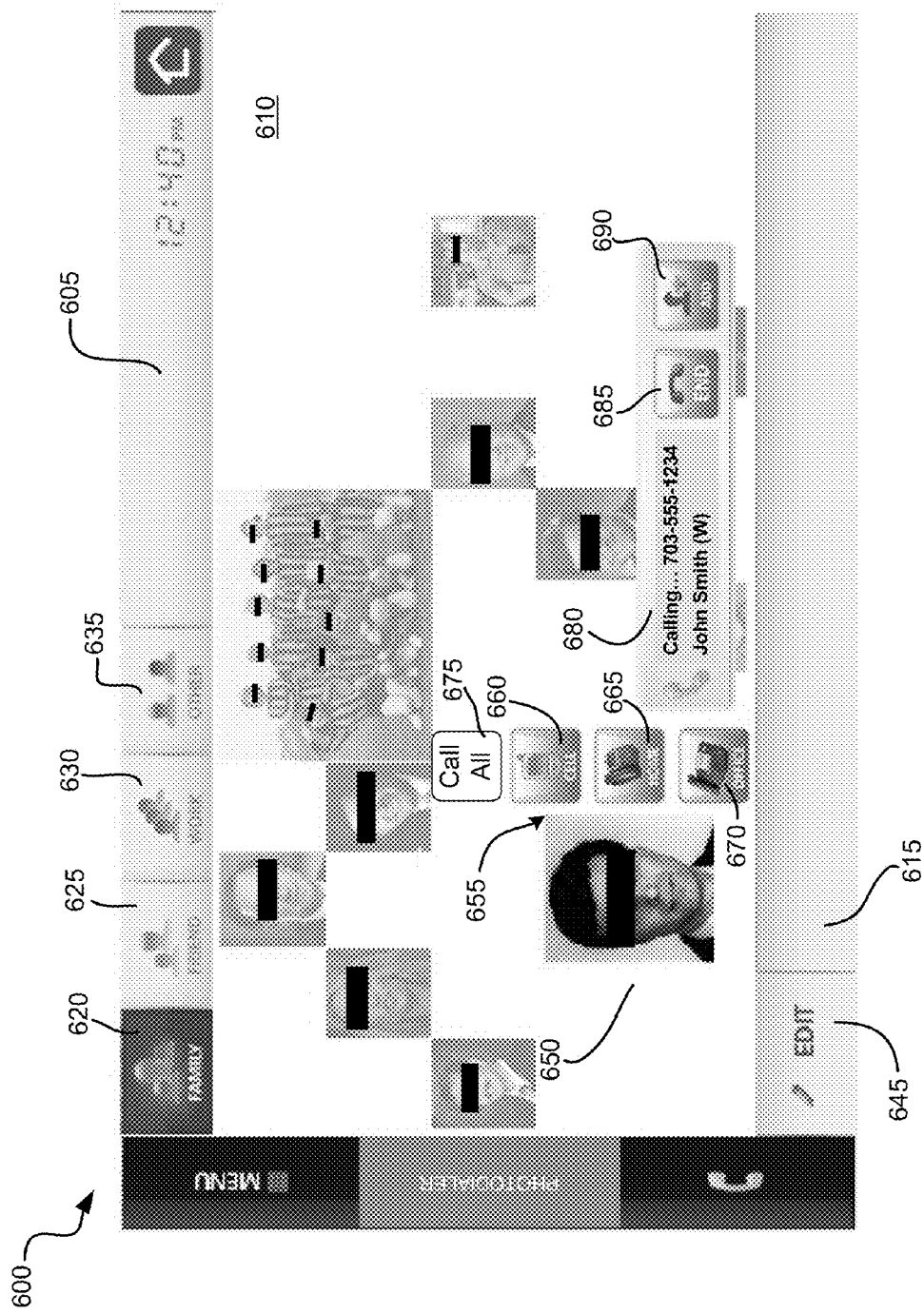

User device 210 may update display 118, e.g., screen 600, to display the status of the initiated call and any call related options (block 445). FIG. 6C illustrates screen 600 upon initiation of a call to the selected number. As shown, user device 210 may update screen 600 to display status information 680 associated with the call, such as the contact number being called and the full name of the contact. In some implementations, user device 210 may be configured to highlight the selected contact image in a variety of manners. For example, in addition to being enlarged, the selected contact image may be brightened or otherwise graphically altered with respect to non-selected contact images. Alternatively, non-selected contact images may be dimmed or lightened, as illustrated in FIG. 6B, to effectively highlight a selected contact image.

Additionally, screen 600 may be updated to display any available in-call options. As shown in FIG. 6C, status information 680 may include an END option 685 and an ADD option 690. Functionality associated with END option 685 and ADD option 690 will be described in additional detail below. Additional in-call options (not shown) may include a mute option for deactivating microphone 114/156, a privacy shade option for temporarily deactivating lens assembly 117 during a video call, a hold option for placing the currently connected call on hold, etc.

Returning to FIG. 4, user device 210 may receive a user selection of END option 685 at any time during the call, either before connection with the called contact or during a connected call (block 450). Upon receipt of END option 685, user device 210 may terminate the current call (block 455) and processing may return to block 410 for display of the address book to the user.

Returning to block 445, user device 210 may, during the call, receive a user selection of ADD option 690, to add another contact to the current call, where this service is available to the user (block 460). In response to the selection of ADD option 690, user device 210 may update screen 600 to display the list of contacts to the user, also designating the contact already included in the current call (block 465).

FIG. 6D illustrates screen 600 upon selection of ADD option 690 in FIG. 6C. As shown, user device 210 may update screen 600 to display a contact screen similar to imaged-based contact region 610, described above with respect to FIG. 6A. However, the contact image associated with the contact currently in the call (e.g., contact image 650) has been modified to designate the current call status, as depicted by modified contact image 650*m* being overlaid with a telephone handset symbol.

User device 210 may receive a user selection of a second contact for addition to the current call (block 470). In one implementation, a second contact may be added to the call in a number of ways. For example, in one implementation, a second contact image (e.g., contact image 695 in FIG. 6D) may be selected from image-based contact region 610. The selected second contact image may then be dragged across image-based contact region 610 and dropped onto modified contact image 650*m*. This dragging and dropping functionality is represented in FIG. 6D by the dashed line connecting contact image 695 and contact image 650*m*.

In an alternative implementation (not shown), second contact image 695 may be selected in a similar manner to first contact image 650. User device 210 may present contact number options and the user may select one of the contact number options for connection to the current call.

User device 210 may initiate the call to the second selected contact (block 475) as a part of the current call. Upon call completion, user device 210 may proceed to block 450 for receipt of the END option selection. In one implementation, the end call request may be based on a user action, such as replacing handset 104 onto base 102. Alternatively, user device 210 may receive a selection of END option 685. Regardless, processing may return to block 455, described above, for termination of the current call. A conference type call with the parties may then commence.

Figure 6E:
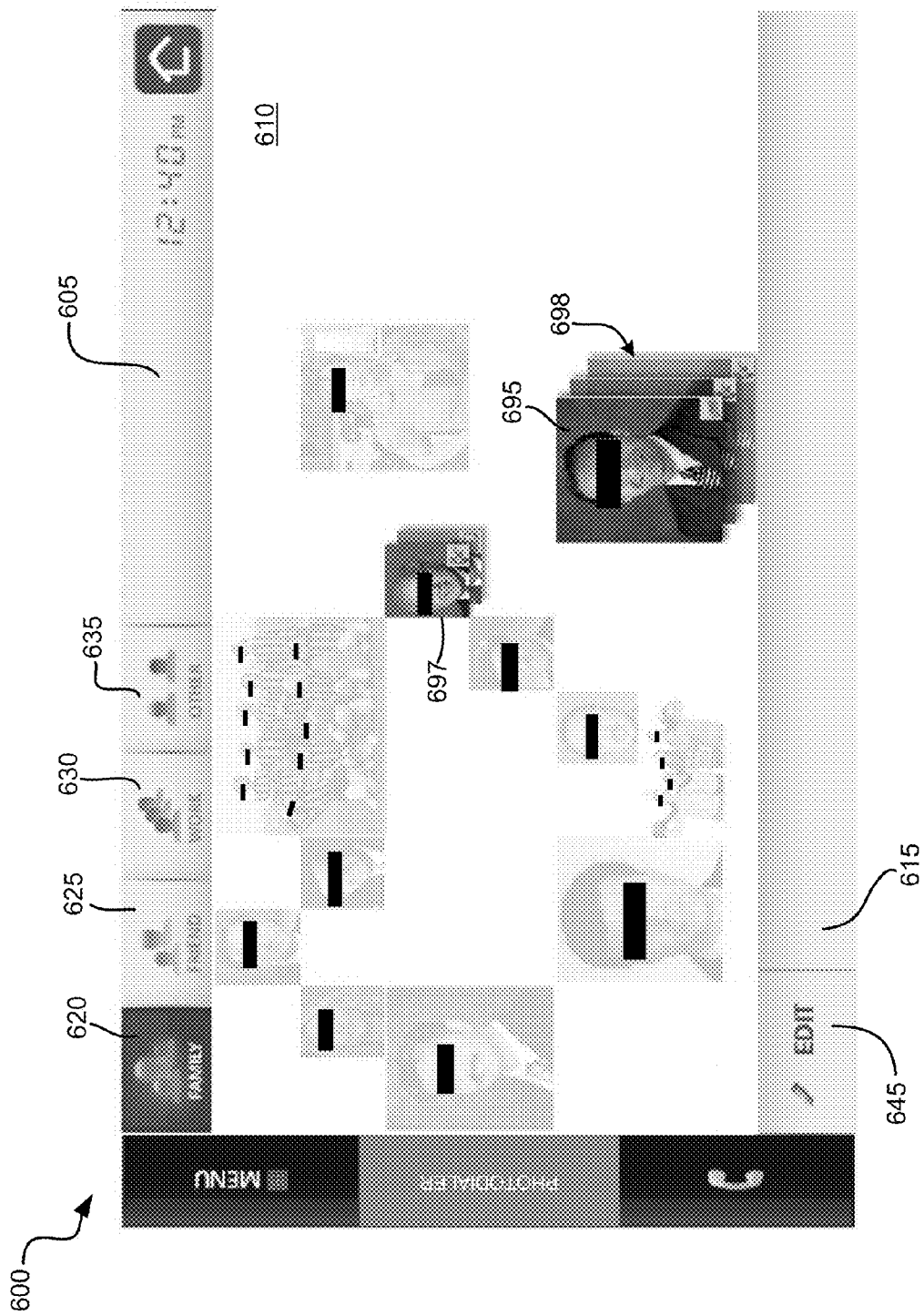

User device 210 may periodically update screen 600 to reflect a recent call/communication history for each contact on image-based contact region 610. For example contact images on image-based contact region 610 may be updated to reflect any recently received calls, dialed calls, missed calls, voicemails, text messages, or emails. FIG. 6E illustrates this concept. As shown, contact images in image-based contact region 610, such as contact image 695 and contact image 697 may include graphical representations of recent communication activities. For example, each of contact images 695 and 697 may include graphical stacks, such as stack 698, depicting recent communications with the respective contacts, with each communication in the stack represented by a layered (e.g., stacked) copy of the contact image modified to include a graphical icon representative of the type of communication. For example, contact image 695 in FIG. 6E includes an associated stack 698 having three elements depicting a recent text message and two missed calls.

FIG. 7 is a flow diagram of an exemplary process 700 for enabling importation and/or modification of contact images. FIG. 7 is described with respect to FIG. 6A as well as FIGS. 8 and 9, which are additional diagrams of graphical user interfaces (e.g., screens) that may be shown on display 118 of user device 100, for example. For simplicity, process 700 is described below with respect to user device 210.

Process 700 may begin when user device 210 receives a user selection of an edit option (block 705). For example, a user may select EDIT option 645 in screen 600, as illustrated in FIG. 6A. Upon receipt of the selection, user device 210 may present a plurality of contact image editing options to the user (block 710).

Figure 8:
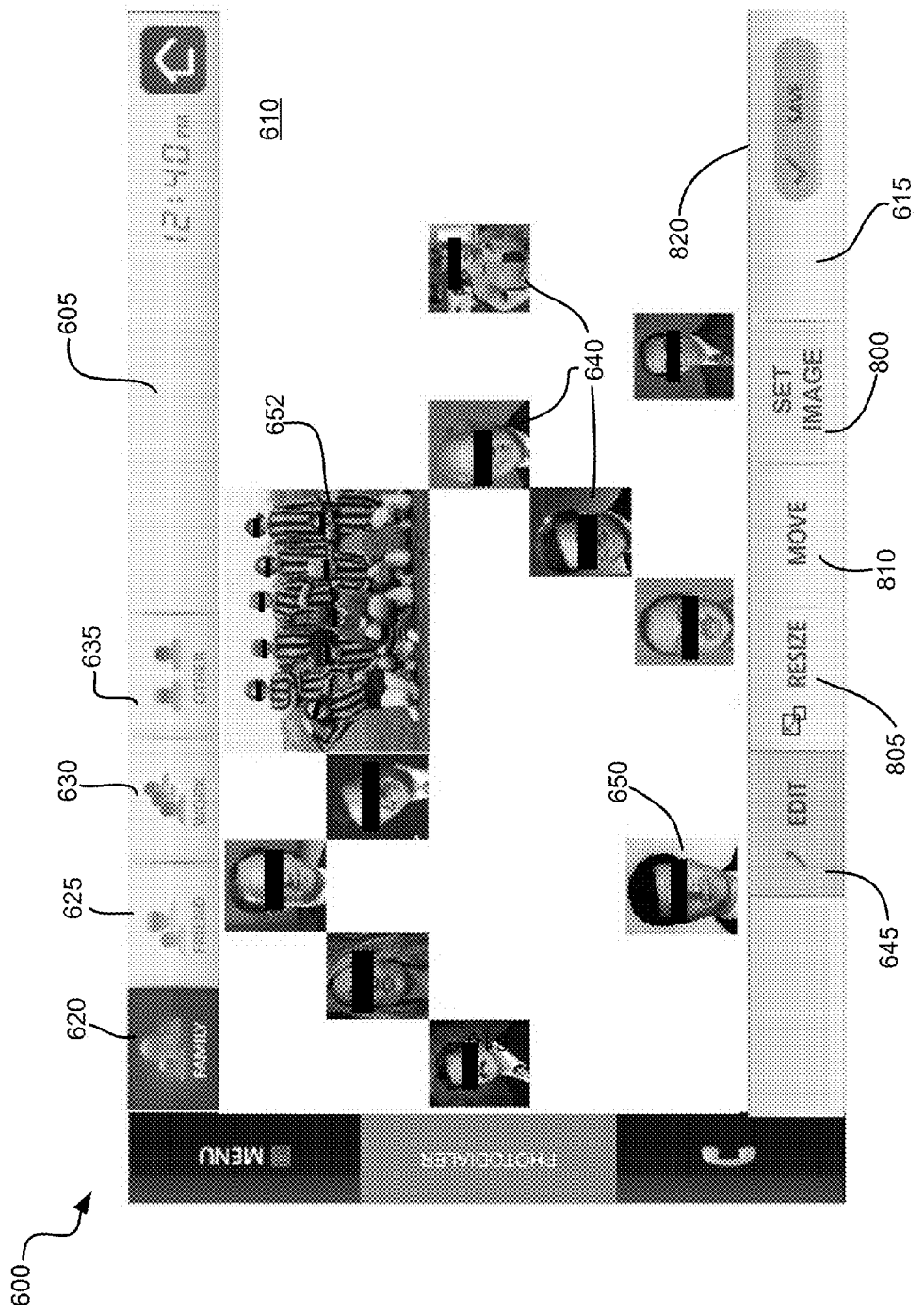
FIGS. 8 and 9 are block diagrams of additional exemplary graphical user interfaces consistent with embodiments described herein.

FIG. 8 is a diagram of user interface screen 600 following receipt of EDIT option 645. As illustrated, editing options presented may include a SET IMAGE option 800, a RESIZE option 805, a MOVE option 810, and a SAVE option 820 in modification region 615 of screen 600.

User device 210 may receive a user selection of a contact for editing (block 715). For example, as described above, user device 210 may receive a selection of a contact by direct interaction with a contact or contact image via a touch screen display, etc. Upon selection of a contact, user device 210 may receive a user selection of SET IMAGE option 800 (block 720). Upon receipt of the SET IMAGE option selection, user device 210 may provide an interface to the user to upload, retrieve, or otherwise associate an image, icon, or photo with a selected contact (block 725). For example, in one implementation, user device 210 may be configured to access and retrieve images from one or more sources, such as Facebook, MySpace, Picasa, Flickr, Photobucket, SnapFish, etc. via network 240. Alternatively, images may be retrieved from storage local to user device 210, such as maintained in memory 360. Retrieved images may then be associated with one or more contacts for display in image-based contact region 610 (block 730).

In yet another implementation, images may be received via lens assembly 117 on user device 210. For example, a user of user device 210 may, during the SET IMAGE option described above, capture or take a picture using lens assembly 117. The captured image may be associated with the selected contact.

In one exemplary embodiment, meta data (e.g., tags) embedded or associated with a retrieved image may be used by user device 210 to identify a contact for association with an image. For example, image(s) retrieved via a Facebook applications programming interface (API) may be tagged or associated with one or more individuals. User device 210 may be configured to compare identification information associated with the selected contact with meta data with the image(s) retrieved via the Facebook API. If user device 210 determines that one or more retrieved photos matches the contact information, user device 210 may display the image(s) to the user via the display for selection by the user.

In other implementations, user device 210 may be configured to receive images from the user in other ways, such as via multimedia message service (MMS), a memory card, networked storage, a mobile phone or instant message application synchronization, etc. Features associated with SET IMAGE option 800 may further include basic image editing functions, such as image cropping and/or rotation, to better enable users to display specific image information in relation to various contacts.

Although photographs or other portrait-type images may be used for a majority of contact images, as depicted in FIGS. 6A-6D, it should be understood that any type of graphic may be used. For example, emergency services contacts (e.g., Fire Department, Police Department, etc.) may be identified by graphical elements or icons corresponding to the respective service. Further, personalized artwork or images may be used as contact images, such as children's drawings, etc. Using such graphical elements as contact images may enable user device 210 to be effectively used by children, illiterate, or foreign language-speaking users. In addition, when depicting businesses or other organizations (e.g., web sites) that are typically not identified as individuals (e.g., the local pizza place, the pharmacy, etc.), contact images may correspond to graphical identifiers that correspond to the organization, such as business logos, etc. Depending on the capabilities of user device 210, organization contact images may also be used to direct user device 210 to a network location (e.g., Internet web site) corresponding to the associated organization.

In additional implementations, a user profile may include information about the user currently logged into user device 210. The information may include user preferences, address book and contact information associated with the user, etc. For example, the user profile may include information corresponding to the contacts and contact images that should be displayed to the user (e.g., default size, default sorting options, etc.). With respect to contact images, the stored user profile may include information relating to the number of contacts for which contact images have not yet been set. In one implementation, this information may be presented as a ratio (e.g., 10 of 100 contacts need images), while in other implementations, this information may be presented as a percentage. Tracking a number of contacts not including images may remind a user to retrieve and/or set images for those contacts that do not yet have contact images associated therewith.

Once the user has identified an image for setting in relation to the selected contact, user device may receive a user selection of SAVE option 820 for storing the image association in user device 210 (block 740).

User device 210 may receive a user selection of RESIZE option 805 (block 745). As described briefly above, image-based contact region 610 may be configured to support contact images having multiple sizes and locations. Such differentiated sizing may provide users with an effective means for designating particular contacts as important or frequently called contacts.

Upon receipt of the RESIZE option 805 selection, user device 210 may provide an interface to the user to resize the contact image associated with the selected contact (block 750). For example, in one implementation, the selected contact image may be surrounded by a dashed line or other similar highlighting, indicating to the user that the contact image may be resized. User device 210 may receive a user indication of the amount of resizing to be performed (block 755). For example, display 118 may include a multi-touch enabled display capable of receiving user resizing instructions by sensing the relative proximity of multiple contact points, with a shrinking proximity indicating a reduction in size and a growing proximity indicating an increase in size. Alternative, user device may receive a corner-based (e.g., aspect ratio maintaining) resizing indication from the user.

User device 210 may dynamically modify a size of the selected contact image in response to the received resizing designation (block 760). Once the user is satisfied with the amount of resizing, processing may proceed to block 740 where user device 210 may receive a user selection of SAVE option 820 for storing the resized contact image.

User device 210 may receive a user selection of MOVE option 810 (block 765). Upon receipt of the MOVE option selection, user device 210 may provide an interface to the user to move the contact image associated with the selected contact (block 770). For example, in one implementation, the selected contact image may be surrounded by a dashed line or other similar highlighting, indicating to the user that the contact image may be moved. User device may receive a user indication of the desired movement of the selected contact image (block 775). For example, if display 118 is a touch screen display, user device 210 may be configured to enable the user to directly move the selected contact image to a desired position on image-based contact region 610. In one implementation, contact images currently displayed at the desired ending location of a moved image may be dynamically moved based on a predetermined algorithm. For example, the contact images currently displayed at the desired ending location may be shifted to the left or down to accommodate the moved contact image.

User device 210 may dynamically modify a location of the selected contact image in response to the received resizing designation (block 780). Once the user is satisfied with the location, processing may proceed to block 740 where user device 210 may receive a user selection of SAVE option 820 for storing the moved contact image.

Figure 9:
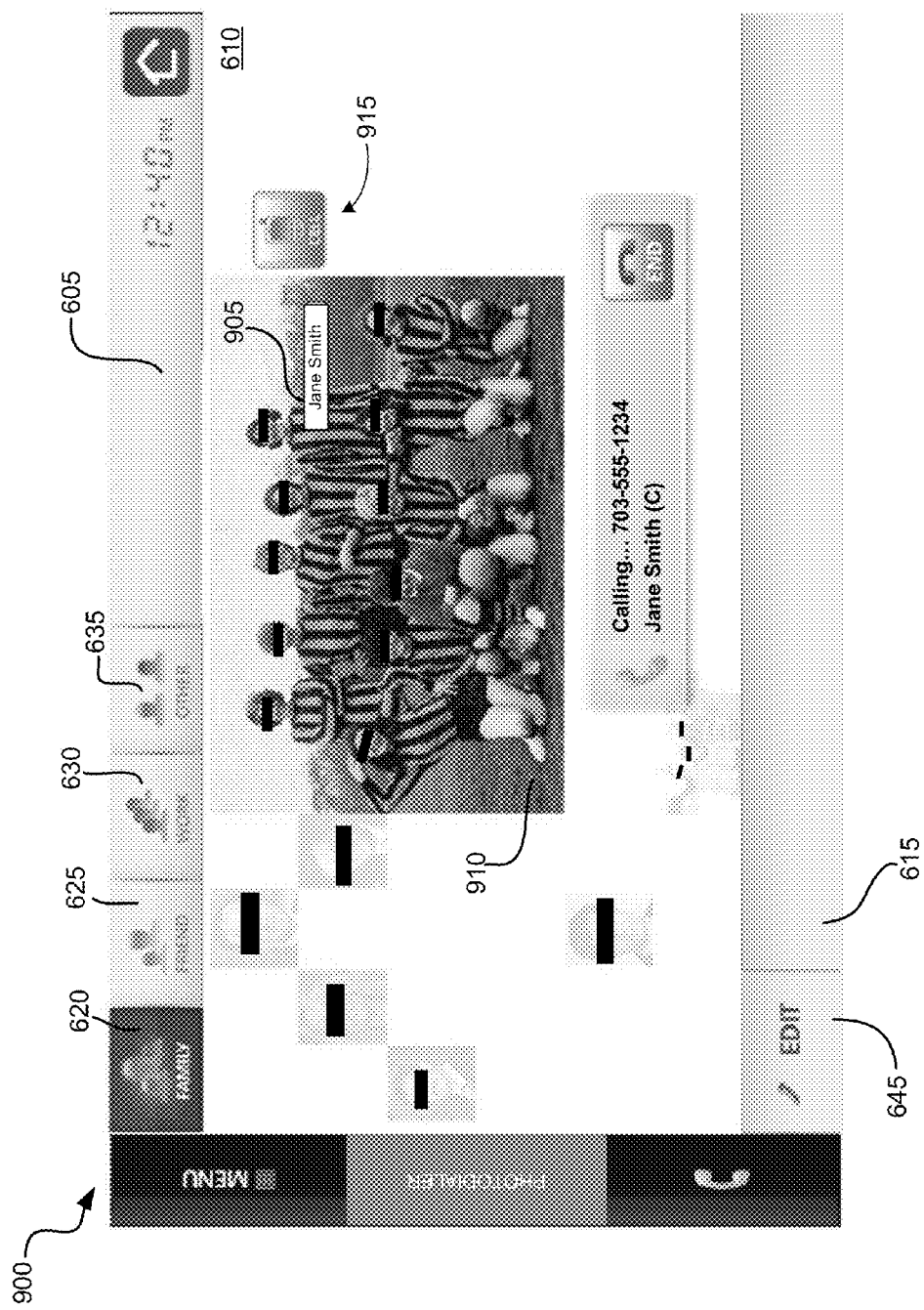

Contact images may include photos that include multiple contacts. For example, contact image 652 in FIG. 6A illustrates a multi-contact image. In one exemplary implementation, discrete portions of a multi-contact image (e.g., contact image 652) may be associated with different contacts. As illustrated, contact image 652 depicts a photo of a women's' rugby team having ten members. In accordance with embodiments described herein, portions of contact image 652 corresponding to those team members included as contacts in user device 210 may be associated with respective contacts. For example, the faces of each contact appearing in the photo may be associated with the respective contact as a discrete contact image. Accordingly, a user may select a contact appearing in the contact image by selecting the corresponding face from those appearing in the multi-contact image. FIG. 9 is a diagram of an exemplary user interface screen 900 in which a particular contact 905 has been selected from multi-contact image 910. As described above in accordance with FIG. 6B, selection of contact 905 may result in user device 210 providing graphical representations 915 corresponding to available numbers associated with contact 905.

In one implementation, identification of individual contacts from multi-contact images may be based on meta data included in or associated with the image. For example, as described above, images retrieved from various sources may be tagged to include identification information associated with individuals appearing in the images. In some instances, the metadata may specify locations in the image file corresponding to specific individuals. This metadata may be used to identify both the existence and location of contacts appearing within a multi-contact image file.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a user device configured to provide communications functionality. In other implementations, features described herein may be implemented mainly in one or more devices that are remote from a mobile or portable device, such as a web server or similar device accessed via, e.g., network 240. For example, the user device may be configured to display contact information received from a remote network device.

Further, while series of acts have been described with respect to FIGS. 4 and 7, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, field programmable gate arrays, or processing logic, software, or a combination of hardware and software.

While particular graphical user interfaces have been described and shown in FIGS. 5, 6A-6E, 8, and 9 these interfaces or screens are purely exemplary. In other embodiments, the interfaces or screens may have different, additional, or differently arranged information and graphics.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   associating a plurality of graphical images with a plurality of contacts in a device having contact management functionality;
   displaying the plurality of graphical images having relative sizes based on a relative importance or priority of the plurality of contacts associated therewith, wherein the relative sizes are determined based on direct user interaction with the plurality of graphical images, and wherein displaying the plurality of graphical images further includes:
- associating a plurality of communications types with a respective plurality of graphical icons,
- identifying a plurality of communications associated with one of the plurality of contacts during a time period,
- determining one of the plurality of communications types associated with each of the plurality of communications,
- modifying, for each of the plurality of communications, a copy of one of the plurality of graphical images for the contact to include one of the plurality of graphical icons for the one of the plurality of communications types associated with the communication, and
- displaying a stack that includes the modified copies of the graphical image, wherein displaying the stack includes presenting for display a portion of each of the modified copies;

receiving a user selection of a first one of the plurality of graphical images, wherein the first one of the plurality of graphical images is associated with a first contact of the plurality of contacts; and initiating a first voice-based communication with the first contact.

2. The method of claim 1, wherein the device comprises a stationary or mobile telephone.

3. The method of claim 1, further comprising:
receiving a request to associate a first graphical image with a first contact in the plurality of contacts;
receiving an indication of a source of the first graphical image;
retrieving the first graphical image from the source; and
associating the retrieved first graphical image with the first contact.

4. The method of claim 3, wherein the source of the first graphical image comprises a received multimedia message or email.

5. The method of claim 3, wherein the source of the first graphical image comprises a location accessible via a network interface.

6. The method of claim 5, wherein the location accessible via the network interface comprises a provider implementing an applications programming interface (API) for retrieving the first graphical image.

7. The method of claim 1, wherein displaying the plurality of graphical images further comprises:
receiving spatial placement instructions from a user for a selected one of the plurality of graphical images, wherein receiving the spatial placement instructions comprises receiving an interaction with the selected one of the plurality of graphical images from the user via a touch screen display of the device to move the selected one of the plurality of graphical images to a different location on the touch screen display; and
displaying the plurality of graphical images based on the received spatial placement instructions.

8. The method of claim 1, wherein displaying the plurality of graphical images further comprises:
receiving image size or resize instructions from a user for one or more of the plurality of graphical images to reflect the relative importance or priority of the plurality of contacts associated therewith; and
simultaneously displaying the plurality of graphical images based on the size or resize instructions.

9. The method of claim 8, wherein the plurality of graphical images are initially provided with a predetermined size.

10. The method of claim 1, further comprising:
determining whether the first one of the plurality of graphical images has a size less than a threshold size;
dynamically enlarging the selected graphical image when the selected graphical image has a size less than the threshold size; and
displaying the enlarged graphical image prior to initiation of the first voice-based communication.

11. The method of claim 1, further comprising:
modifying a size of the plurality of graphical images to reflect a communication history associated with the plurality of contacts corresponding to each of the plurality of graphical images.

12. The method of claim 11, wherein modifying the size of the plurality of graphical images to reflect the communication history further comprises:
increasing a first size associated with a first subset of the graphical images associated with more frequently contacted contacts relative to a second size associated with a second subset of the graphical images associated with less frequently contacted contacts.

13. The method of claim 1, further comprising:
receiving a selection of a second graphical image from the plurality of graphical images; and
initiating a second voice-based communication with a second contact associated with the second graphical image, wherein the first voice-based communication and the second voice-based communication are bridged together.

14. The method of claim 13, wherein the second graphical image is selected by dragging and dropping the second graphical image onto the first one of the plurality of graphical images.

15. A device comprising:
a memory configured to store data associated with a plurality of contacts; and
a processor configured to:
- receive data associated with a plurality of graphical images,
- associate the plurality of graphical images with a plurality of contacts,
- store, to the memory, the data associated with the plurality of graphical images,
- cause a display to present the plurality of graphical images to a user, and
- initiate, via a communication interface, voice-based communication with one or more contacts based on a user selection of a graphical image associated with the one or more contacts, wherein the processor, when causing the display to present plurality of graphical images, is further configured to:
- determine whether the selected graphical image has a size less than a threshold size,
- dynamically enlarge the selected graphical image when the selected graphical image has a size less than the threshold size,
- cause the display to present the enlarged graphical image prior to initiation of the voice-based communication,
- associate a plurality of communications types with a respective plurality of graphical icons,
- identify a plurality of communications associated with one of the plurality of contacts during a time period, determine one of the plurality of communications types associated with each of the plurality of communications, modify, for each of the plurality of communications, a copy of one of the plurality of graphical images for the contact to include the graphical icon for the communication types associated with the communication, and cause the display to present a stack that includes the modified copies of the graphical image, wherein the stack presents portions of each of the modified copies.

16. The device of claim 15, wherein the processor, when associating the plurality of graphical images with a plurality of contacts, is further configured to, for each received graphical image:

identify one or more individuals in the graphical image, determine whether a contact in the plurality of contacts matches an identified individual, and associate the graphical image with the contact when the contact matches the identified individual.

17. The device of claim 16, where the processor is further configured to identify the one or more individuals in the graphical image based on meta data associated with the graphical image.

18. The device of claim 17, wherein the meta data indicates a location associated with the graphical image, and wherein the processor is further configured to identify the one or more individuals based on the location.

19. The device of claim 15, wherein the processor is further configured to:

modify a size of the plurality of graphical images relative to other graphical images to reflect a communication history associated with the plurality of contacts corresponding to each of the plurality of graphical images.

20. The device of claim 15, wherein the processor, when receiving the data associated with the plurality of images, is configured to receive the plurality of graphical images from at least one of a remote network location, a memory card upload, a multimedia message, or a synchronization activity with another device.

21. A non-transitory computer-readable memory device including instructions executable by at least one processor, the computer-readable memory device comprising one or more instructions that, when executed by the at least one processor, cause the at least one processor to:

receive a plurality of graphical images;

associate the plurality of graphical images with a plurality of contacts;

receive spatial placement instructions from a user for a selected one of the plurality of graphical images for indicating relative spatial positioning of the selected one of the plurality of graphical images relative to others of the plurality of graphical images, wherein receiving the spatial placement instructions comprises receiving an interaction with the selected one of the plurality of graphical images from the user via a touch screen display of an electronics device to move the selected one of the plurality of graphical images to a different location on the touch screen display;

display the plurality of graphical images to the user based on the received placement instructions, wherein the one or more instructions, when cause the at least one processor to display the plurality of graphical images, further cause the one or more processors to:

associate a plurality of communications types with a respective plurality of graphical icons, identify a plurality of communications associated with one of the plurality of contacts during a time period, determine one of the plurality of communications types associated with each of the plurality of communications, modify, for each of the plurality of communications, a copy of one of the plurality of graphical images for the contact to include one of the plurality of graphical icons for the one of the plurality of communications types associated with the communication, and display a stack that includes the modified copies of the graphical image, wherein displaying the stack includes presenting for display a portion of each of the modified copies;

receive a user selection of a selected one of the plurality of graphical images; and initiate voice-based communication with the contact associated with the selected graphical image.

22. The non-transitory computer-readable memory device of claim 21, wherein the one or more instructions, when causing the one or more processors to associate the plurality of graphical images with a plurality of contacts, further cause the one or more processors to:

automatically identify individuals appearing in the plurality of graphical images;

identifying contacts from the plurality of contacts that match the identified individuals; and associate graphical images having identified individuals to respective contacts matching the identified individuals.

23. The non-transitory computer-readable memory device of claim 22, wherein a single graphical image may be associated with multiple contacts.

24. The non-transitory computer-readable memory device of claim 23, wherein the selected one of the plurality of graphical images is associated with the multiple contacts, wherein the multiple contacts are associated with respective different portions of the single graphical image, and wherein the one or more instructions, when executed by the one or more processors, further cause the one or more processors to:

determine a particular portion, of the respective different portions of the single graphical image, associated with the user selection, and identify, as the contact associated with the selected graphical image, one of the multiple contacts associated with the particular portion the single graphical image.

* * * * *